Oct. 19, 1954
E. F. PETERS ET AL
2,692,261
POLYMERIZATION OF ETHYLENE WITH NICKEL
OR COBALT ON ACTIVATED CARBON
Filed April 25, 1951
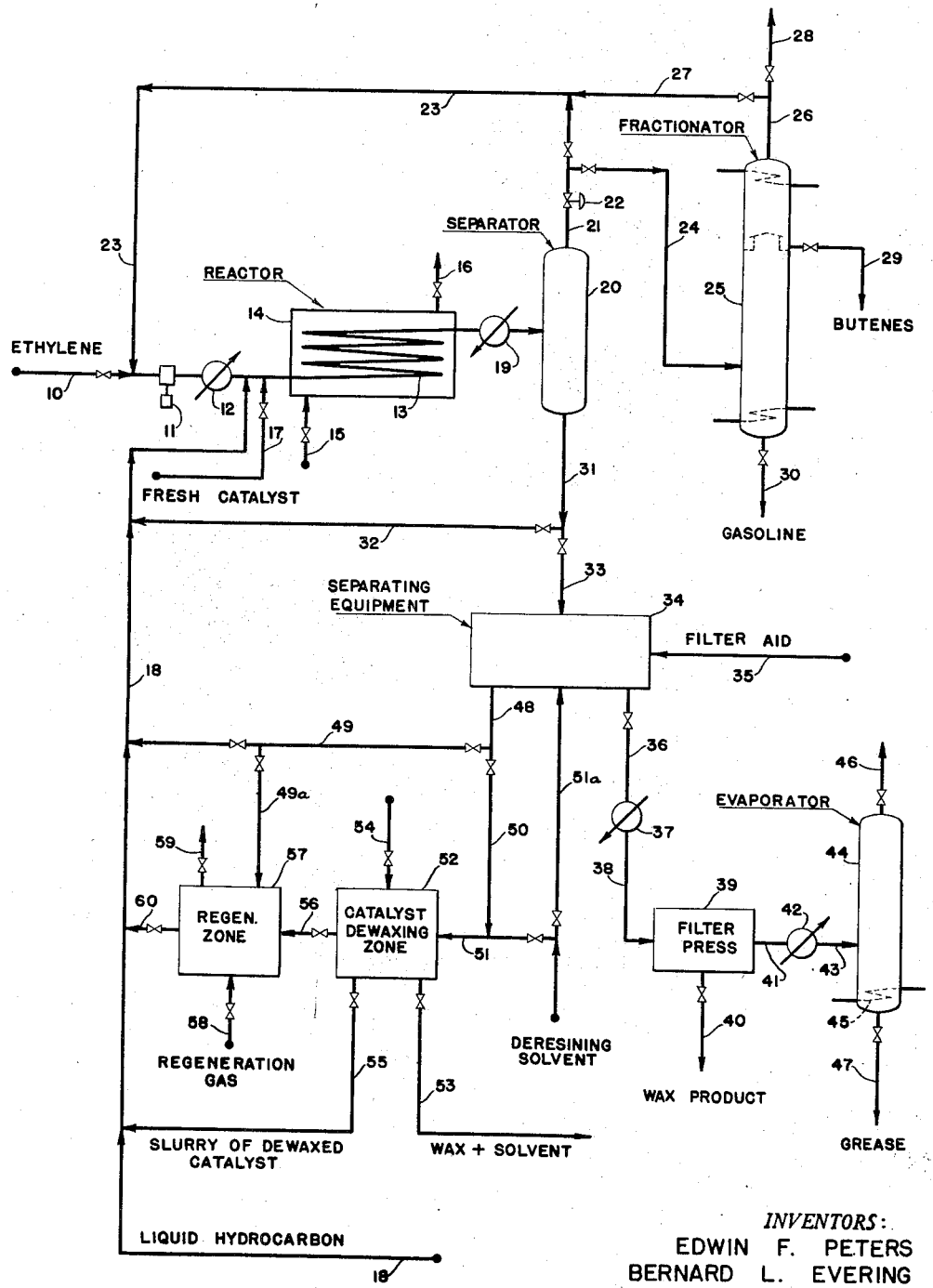
INVENTORS:
EDWIN F. PETERS
BERNARD L. EVERING
BY:
ATTORNEY:

Patented Oct. 19, 1954

2,692,261

UNITED STATES PATENT OFFICE 2,692,261

POLYMERIZATION OF ETHYLENE WITH NICKEL OR COBALT ON ACTIVATED CARBON

Edwin F. Peters and Bernard L. Evering, Chicago, Ill., assignors to Standard Oil Company, Chicago, Ill., a corporation of Indiana Application April 25, 1951, Serial No. 222,802

16 Claims. (Cl. 260—94.9)

This invention relates to a process for the polymerization of ethylene and, more particularly, to a process for converting ethylene in substantial yields to normally solid, wax-like and/or tough, resinous polymerization products. In one aspect, this invention is concerned with a process for converting ethylene into one or more relatively high molecular weight hydrocarbon products including grease-like hydrocarbon materials of Vaseline-like consistency at normal temperatures, hydrocarbon products of hard, paraffin wax-like character and tough, resinous chemically inert, high molecular weight polymers having the essential characteristics of the commercial polyethylene films having average molecular weights in the range of about 10,000 to about 30,000 This application is a continuation-in-part of our copending application Serial No. 158,571, filed April 27, 1950, now abandoned.

The conversion of ethylene to dimers and to normally liquid olefins boiling within the gasoline boiling range, principally hexenes, in the presence of active carbon-supported cobalt and nickel catalysts is well known (note for example, German Patent 559,736 and U. S. Patent 2,380,358). However, the polymerization of ethylene to form normally solid, relatively high molecular weight products boiling substantially above the boiling range of gasoline, has heretofore, to our knowledge, been accomplished only through the subjection of ethylene to rather high temperatures and extremely high pressures (at least 100° C. and at least 15,000 p. s. i. g.), optionally in the presence of small proportions of oxygen (as in the processes described in U. S. Patent 2,153,553 of E. W. Fawcett et al. and 2,188,465 of M. W. Perrin et al.) or to the action of peroxide catalysts, usually at high temperatures and pressures.

One object of our invention is to provide a novel process for the conversion of ethylene in the presence of certain eighth group metal catalysts. Another object of our invention is to provide a process for the conversion of ethylene in the presence of nickel and/or cobalt catalysts to produce substantial yields of normally solid polymerization products. Another object of our invention is to provide a process for the conversion of ethylene in the presence of nickel and/or cobalt catalysts to produce substantial yields of hydrocarbon greases. Another object of our invention is to provide a process for the conversion of ethylene in the presence of nickel and/or cobalt catalysts to produce substantial yields of tough, resinous, thermoplastic high molecular weight polymers. Still another object of our invention is to provide a process for the conversion of ethylene to normally solid hydrocarbon products at moderate pressures and relatively low temperatures. Yet another object of our invention is to provide the art with new synthetic hydrocarbon waxes and resins. These and other objects of our invention will become apparent from the ensuing description thereof.

We have discovered, unexpectedly, that ethylene can be converted principally, even almost exclusively, to normally solid polymers by treatment with a nickel, cobalt or mixed nickel-cobalt catalyst in certain hydrocarbon reaction media which are liquid under the reaction conditions. The catalytic metals are preferably supported upon an activated carbon, such as an activated coconut or wood charcoal. As has been indicated above, ethylene polymerizes in the absence of said liquid hydrocarbon reaction media upon contact with cobalt catalysts under otherwise similar operating conditions to yield principally butenes and hexenes. With nickel catalysts under similar operating conditions somewhat larger amounts of normally solid ethylene polymers along with the lower molecular weight olefin polymers are produced.

Briefly, a gas stream comprising essentially ethylene, substantially free of catalyst poisons or ethylene polymerization inhibitors, is brought in contact with an activated carbon-supported metal selected from the class consisting of nickel, cobalt and nickel-cobalt mixtures at a temperature sufficient to induce ethylene polymerization, said temperature being between about 10° C. and about 250° C. or 300° C., at a polymerization pressure between about 50 and about 15,000 p. s. i. g. in the presence of a liquid hydrocarbon reaction medium such as benzene, xylenes, n-octane or the like, employing about 0.52 to about 90 percent by weight of ethylene, calculated on the total weight of ethylene and liquid hydrocarbon reaction medium, at a weight space velocity selected in the range of about 0.01 to about 5 grams of ethylene per hour per gram of catalyst. Under these conditions, ethylene is converted, in substantial, often predominant yields, to grease-like and normally solid polymers having molecular weights between about 300 and 25,000 or even more, accompanied by relatively minor yields of ethylene dimer and liquid polymerization products boiling within the boiling range of gasoline.

In the usual practice of the present invention, gaseous, liquid and some of the normally solid ethylene conversion products are continuously withdrawn from the reaction zone and may be separated by conventional fractional distillation, filtration and crystallization procedures. A part of the normally solid polymerization products may be retained upon the surface of the solid polymerization catalyst.

In the present process, the catalysts do not appear to suffer substantial, or sometimes even appreciable, loss of polymerization capacity by reason of the occlusion of solid ethylene polymerization products thereon. However, from time to time the catalysts can be dewaxed (which term herein is intended also to include deresining by liquation of solid polymers therefrom and/or by extracting the catalysts with wax solvents at temperatures in the range of about 100° C. to about 300° C. or higher at atmospheric or superatmospheric pressures. For example, dewaxing can be effected by contacting the catalyst with aromatic hydrocarbon solvents such as benzene, toluene, xylenes, ethylbenzene, ethyltoluenes, misitylene, isodurene and the like, or with other solvents, following which the solution of wax in the extraction solvent is separated from the catalyst, cooled to effect crystallization of wax and resins from the solvent and/or subjected to evaporation to remove the solvent from the solute. The dewaxed catalyst can then be returned to the reaction zone for contact with further amounts of ethylene or can first be regenerated by treatments hereinafter described. The normally solid ethylene polymerization products produced by our process can be fractionated by known techniques and by the specific methods which will be described hereinafter.

To describe the present invention in somewhat greater detail, attention will be concentrated first upon the polymerization feed stock. The feed stock comprises essentially ethylene. Carbon monoxide, oxygen, hydrogen sulfide and ammonia function as catalyst poisons and should be removed from feed stocks in which they are present. Although carbon monoxide is quite readily removed by treating the catalyst with hydrogen, we have found that ammonia is very tenaciously adsorbed in the activated carbon-supported catalysts and is quite difficult to remove by high temperature (300-350° C.) hydrogen treating of the catalysts. Oxygen in relatively small proportions, up to 1000 to 2000 p. p. m., does not appear to exert a deleterious effect on the present ethylene polymerization process, although when the cumulative amount of oxygen charged to the catalyst is as high as about 3 mol percent based upon the metal content of the catalyst, substantial deactivation of the catalyst may occur. Commercial ethylene streams containing from about 100 to about 1000 parts per million of oxygen can, therefore, be employed without special deoxygenation treatment in the practice of the present invention. In peroxide-catalyzed process for ethylene polymerization, amounts of oxygen within the range of 100 to 1000 p. p. m. in the ethylene feed stock are usually considered to exert a substantial deactivating effect.

The presence of acetylene in amounts substantially greater than trace quantities is undesirable. Thus (run 25) the treatment of a mixture of 2 percent acetylene, 68 percent ethylene and 30 percent benzene with a catalyst consisting of 1 percent nickel supported on nitric acid-washed coconut charcoal in a flow reactor at 155° C., 2200 p. s. i. g. and 0.5 volume of total feed per hour per volume of catalyst failed to yield more than a trace of solid ethylene polymer, possibly because of the formation of nickel acetylide. Under otherwise identical conditions but in the absence of acetylene the polymerization of ethylene has been found to yield 60 grams of solid polymer in 5 hours.

Ethane and other normally gaseous paraffin hydrocarbons in the ethylene charging stock function as diluents, but not as catalyst poisons and may, therefore, be present in the feed stock. Normally gaseous olefins other than ethylene are preferably removed from the feed stock since they tend to reduce the degree of ethylene polymerization, especially when present in concentrations greater than about 10 volume percent, based on ethylene.

The olefin and liquid hydrocarbon reaction medium can be separately introduced into contact with the catalyst. In another mode of operation a solution of the feed stock in the liquid hydrocarbon reaction medium can be prepared and the solution brought into contact with the solid catalyst. Thus, ethylene can be selectively absorbed from its mixtures with other gases, particularly hydrogen, methane and ethane, in a suitable liquid hydrocarbon reaction medium, preferably an aromatic hydrocarbon such as benzene, a xylene, ethylbenzene, mesitylene or the like at temperatures between about 10° C. and about 100° C. and pressures between about 50 and about 1200 p. s. i. g., and the rich absorbent can be brought into contact with the solid polymerization catalyst. If desired, both the gaseous feed stock and the liquid hydrocarbon reaction medium can simultaneously be brought into contact with the solid catalyst.

The employment of a liquid hydrocarbon reaction medium as hereinafter defined is essential to the operation of the present process in order to avoid the polymerization of ethylene principally to gaseous and low boiling liquid ethylene polymers and to effect a shift in the product distribution principally or, substantially exclusively, towards the formation of normally solid polymers from ethylene. The liquid hydrocarbon reaction medium employed in the present process appears to perform a variety of functions, and to perform these functions in varying degrees depending upon the operating conditions, catalyst and identity of the medium. Thus, the liquid hydrocarbon reaction medium appears to function as a solvent for ethylene to bring ethylene into the necessary contact with the catalyst surface and/or growing ethylene polymer chain. The liquid hydrocarbon reaction medium may function to protect the growing polymer chain from chain breakers, such as reaction-inhibiting impurities in the feed stock, polymer already formed upon certain parts of the catalyst surface, etc. The liquid hydrocarbon reaction medium serves to reduce the viscosity of the solid polymer retained upon and within the catalyst and thus may facilitate the process of transferring ethylene where it is needed. The medium dissolves some of the normally solid product from the catalyst surface. The liquid hydrocarbon reaction medium makes possible a gas-liquid interface in which the growing ethylene polymer chain may be oriented and from which it may react with ethylene supplied from solution in the medium and/or from the gas phase. The aromatic liquid hydrocarbon reaction media which we have employed do not appear to enter into reaction with ethylene or polyethylenes since infra-red examination of the normally solid products has not yielded evidence of the presence of more than trace amounts of aromatics in the products. It should be understood, however, that we are in nowise bound by the theoretical considerations herein advanced to explain possible modes of action of the liquid hydrocarbon reaction medium. The fact remains that the inclusion of certain liquid hydrocarbon media in the polymerization reaction zone in contact with the catalyst produces a startling, unpredictable, and in a large measure unexplained, change in the polymerization of ethylene conducive to the formation of high yields of normally solid hydrocarbon products.

Various classes of hydrocarbons which are liquid under the polymerization reaction conditions of the present process and which are not aliphatic olefins can be employed. As the examples submitted hereinafter show, we have successfully employed hydrocarbons representative of the aromatic hydrocarbon series, particularly the mononuclear aromatic hydrocarbons, viz. benzene, xylenes, mesitylene and xylene-p-cymene mixtures. Tetrahydronaphthalene has also been employed. In addition, we may employ such aromatic hydrocarbons as toluene, ethylbenzene, isopropylbenzene, n-propylbenzene, sec-butylbenzene, t-butylbenzene, ethyltoluene, ethylxylenes, hemimellitene, pseudocumene, prehnitene, isodurene, diethylbenzenes, isoamylbenzene and the like. Suitable aromatic hydrocarbon fractions can be obtained by the selective extraction of aromatic naphthas, from hydroforming operations, etc. The aromatic hydrocarbons may contain more or less saturated hydrocarbons, as commercially produced, but should be freed of polyolefins and aromatic olefins such as styrene before use in the present invention by acid treatment, e. g. with anhydrous p-toluenesulfonic acid, sulfuric acid, or by equivalent treatments, for example treatment with maleic anhydride. In general, both commercial availability and suitability for the present purpose indicate a preference for mononuclear aromatic hydrocarbons having between about 6 and about 10 to 12 carbon atoms per molecule. Alkylbenzenes, particularly methylbenzenes, constituted a preferred subclass of liquid hydrocarbon reaction media for our purposes. We may also employ certain alkyl naphthalenes which are liquid under the polymerization reaction conditions, for example, 1-methylnaphthalene, 2-methylnaphthalene, 1-ethylnaphthalene, 2-ethylnaphthalene, 2-isopropylnaphthalene, 1-n-amylnaphthalene and the like.

Certain classes of saturated aliphatic hydrocarbons can also be employed as a liquid hydrocarbon reaction medium in the present process. Thus, we may employ various saturated hydrocarbons (alkanes and cycloalkanes) which are liquid under the polymerization reaction conditions and which do not crack substantially under the reaction conditions. Either pure alkanes or cycloalkanes or commercially available mixtures, freed of catalyst poisons, may be employed. For example, we may employ straight run naphthas or kerosenes containing alkanes and cycloalkanes. Specifically, we may employ liquid or liquefied alkanes such as n-butane, isobutane, n-hexane, 2,3-dimethylbutane, n-octane, n-dodecane, cyclohexane, methylcyclohexane, dimethylcyclopentane, ethylcyclohexane and the like.

As will appear from the specific examples supplied hereinafter, the various liquid hydrocarbon reaction media which can be employed are not in all senses equivalent to each other. In certain instances we have noted that individual liquid hydrocarbon reaction media exert specific desired effects to a high degree and that the effects exerted by the particular hydrocarbon in question are not general to all the liquid hydrocarbons which may be employed as reaction media in the present invention. As will appear hereinafter, we have discovered preferred effects attendant on the employment of polymethylbenzenes such as the xylenes, mesitylenes, and xylene-p-cymene mixtures and the like as liquid hydrocarbon media, and these media therefore constitute a preferred subclass of liquid hydrocarbon reaction media for the practice of the present invention.

The liquid hydrocarbon reaction medium may be present in the polymerization reaction zone in proportions of about 10 to about 98 percent by weight, based on the weight of both ethylene and reaction medium. The liquid hydrocarbon reaction medium is present in the reaction zone as a distinct liquid phase. At low ratios of ethylene to the hydrocarbon reaction medium, for example ratios between about 2 and about 30 percent, temperature control during the course of the ethylene conversion process can be readily accomplished owing to the presence in the raction zone of a large liquid mass having relatively high heat capacity. The liquid hydrocarbon reaction medium can, moreover, be cooled by indirect heat exchange inside or outside the reaction zone.

At relatively high concentrations of ethylene in the hydrocarbon reaction medium, say between about 60 and about 90 percent by weight, based on both components, a high rate of ethylene polymerization may be achieved even though complete solution of the ethylene in the reaction medium may not prevail in the reaction zone and a product may be produced directly from the reactor which contains a relatively low proportion of the hydrocarbon reaction medium. However, as will appear from the specific examples supplied hereinafter, the percentage of the ethylene charge which is converted at low concentration in a hydrocarbon reaction medium may be substantially higher than at a high ethylene concentration in the same reaction medium.

The catalysts employed in the operation of our process comprise essentially nickel, cobalt and cobalt-nickel mixtures. We have found that nickel catalysts are surprisingly superior to cobalt catalysts for the purpose of producing tough, resinous high molecular weight polymers from ethylene.

In order to increase the accessibility of the catalytic metal to the ethylene, it is desirable by some means to dilute, attenuate or extend the catalytic metal, and this may be done in a variety of ways. Thus, the catalystic metal may be diluted by employing it in the form of an alloy with one or more other metals which do not adversely affect the desired ethylene polymerization reaction; the catalytic metal and diluent metal can both be deposited on active carbon, e. g., activated coconut charcoal. For example, the nickel and/or cobalt may be employed as alloys or mixtures with copper. The catalysts may be employed in the form of pellets, powders, turnings, screens or colloidal dispersions in the liquid hydrocarbon reaction medium. The surface of the catalytic metal may be etched by treatment with strong acids, particularly nitric acid, followed by water washing and hydrogen reduction in order to effect activation.

Although it might appear obvious that the surface of the catalytic metal could be readily and conveniently extended by deposition of the metal upon any one of a number of porous or absorbent supports, we have made the surprising discovery that this is not, in general, feasible. Highly active nickel and cobalt catalysts for hydrogenation of fats and other unsaturated organic materials have heretofore been prepared by depositing various nickel and cobalt salts or other compounds upon porous supports such as silica gel, alumina, celite, kieselguhr, aluminosilicates, etc. decomposing the nickel or cobalt compound, usually to form the corresponding metal oxide and hydrogenation of the metal oxide to produce the catalytically active metal (Carleton Ellis, "Hydrogenation of Organic Substances," D. Van Nostrand Co., Inc. (1930)). We have found, however, that the nature of the support specifically and unpredictably affects the utility of the nickel and cobalt catalysts for the purposes of polymerizing ethylene to normally solid polymers. Alumina and silica supports greatly reduce or, in some instances, virtually destroy the power or nickel and cobalt to catalyze the polymerization of ethylene to form normally solid polymers.

We have found that activated carbons, particularly activated charcoals derived from cellulosic materials having surface areas between about 700 and about 1200 m.$^2$/g., pore volumes of about 0.53 to 0.58 cc. per gram and pore diameters of about 20 to 30 Å., and, in some instances, small amounts of combined oxygen, greatly enhance the catalytic activity of nickel and cobalt for the purposes of ethylene polymerizations, as compared with the activity of the unattenuated catalytic metals. When activated carbons are covered with water and the mixture is stirred for some time at room temperature, the water leaches various materials therefrom and its often happens that the resultant aqueous solutions are slightly basic; it is desirable to neutralize the basic materials in such carbons, particularly coconut charcoals, by treating the carbons with nitric acid, following which residual nitric acid is removed by the application of heat to effect vaporization, or decomposition and vaporization. The nitric acid treatment of carbon causes some oxidation thereof.

The catalytic metal can be deposited upon the active carbon support by various methods well known in the art of catalyst preparation. Thus, the catalytic metal can be adsorbed upon the carbon in the form of a decomposable salt, e. g., in the form of nickel or cobalt nitrates, formates, carbonates, etc. We prefer to prepare the catalysts from nickel and/or cobalt nitrates. The adsorbed salt can be decomposed to yield nickel or cobalt oxides upon and within the active carbon support, and the oxides can be reduced to the catalytically active metals by treatment with hydrogen. The salt of the catalytic metal can be adsorbed on the active carbon support in amounts sufficient to provide reduced catalytically active metal in concentrations between about .01 and about 20 percent by weight in the finished catalyst. Hydrogen reduction of the catalytic metal oxides can be effected at temperatures between about 175° C. and about 400° C. preferably from about 200° C. to about 250° C. and hydrogen pressures from about 1 mm. of mercury to about 2000 p. s. i. g.

To enter into some further detail concerning the step of decomposing the metal salt, e. g., nickel nitrate, to produce the corresponding metal oxide in the above-described procedure for producing catalysts, we may state that metal salt decomposition is suitably practiced under a partial vacuum such as 1–20 mm. of mercury (absolute pressure) or, preferably, in the presence of steam.

As an alternative to adsorbing the catalytic metal upon the active carbon support in the form of a salt, use may be made of a readily decomposable compound such as carbonyl, which can then be thermally decomposed to yield the catalytic metal. Even when nickel and cobalt catalysts are derived from the metal carbonyls, it is advisable to subject the catalysts to a treatment to remove carbon monoxide which has been adsorbed by the porous active carbon, e. g. to evacuation or to stripping with chemically inert gases such as nitrogen, at elevated temperatures between about 175° C. and about 400° C. Adsorbed carbon monoxide may be removed from the catalyst by treatment with hydrogen at 175° C. to 400° C. and hydrogen pressures of about 200 to about 2000 p. s. i. g.

At relatively low concentrations of catalytic metal on active carbon, high pressure and low temperature, the possibilities of increasing the proportion of high molecular weight tough, resinous polyethylene in the total polymer are increased. At low metal concentrations (.01 to 5 weight percent) on the active carbon, it is more desirable to pretreat the active carbon by washing with nitric acid to minimize the ratio of acid-soluble contaminants in the active carbon to the catalytic metal.

We have found that active carbon supported-nickel, under certain conditions, yields substantially greater amounts of tough, resinous high molecular weight polymers from ethylene than cobalt/carbon catalysts.

The particle size of the supported or unsupported metal catalysts can be varied to suit the requirements of the reaction equipment and process flow. Thus, if a stationary bed of catalyst is desired, the catalyst may be employed in the form of coarse fragments or pellets, e. g. as cylinders of about $\frac{1}{16}$ to ¾ inch length and $\frac{1}{16}$ to ¾ inch diameter. In fixed beds, we may also employ 6 to 14 mesh catalysts, and the like. When it is desired to prepare a slurry of catalyst in the liquid hydrocarbon reaction medium, smaller particle size catalyst, for example, a powder can be employed. Finer than 300 mesh powder, which can be prepared by conventional methods, e. g. by ball milling coarse catalyst pellets or powder, may be used.

Although we have found that ethylene can be polymerized to normally solid polymers at room temperature or even lower temperatures, we prefer to employ temperatures in the range of about 100° C. to about 150° C., especially temperatures between 120° C. and 150° C., although temperatures up to about 250° C. or even 300° C. may be employed. Within the preferred temperature range, the normally solid ethylene polymers are in molten or semi-liquid condition, which facilitates the removal of polymer from the catalyst and appears to facilitate ethylene transfer through the polymer to the catalyst surface. Also, the yields of solid ethylene polymers are usually at a maximum within the preferred temperature range. It will be understood that the selection of the best operating temperature in any specific instance must be made in consideration of other operating variables, such as the catalyst activity, pressure, identity of the liquid hydrocarbon reaction medium, ethylene concentration and the specific product distribution which is desired.

The reaction pressure should be at least about 50 pounds to obtain satisfactory yields of solid ethylene polymers, but otherwise appears to be limited only by the maximum pressure economically attainable in the equipment. Thus, maximum pressures in our process may be as high as 15,000 pounds or 20,000 pounds or even more. However, solid ethylene polymers can be made in satisfactory yields by the present process at relatively low pressures, e. g. about 300, 500, 2000 or 5000 pounds, which constitutes a distinct advantage of the present process over the processes heretofore known to be capable of producing the same or similar ethylene polymerization products. In general, we prefer to employ pressures between about 300 and 8,000 pounds. The pressures under consideration here are total pressures in the polymerization reaction zone. However, the pressure in the reaction zone is due largely to ethylene and, bearing this fact in mind, if large proportions of a diluent such as ethane are present in the feed stock, correspondingly higher pressures should be employed in order to obtain suitable ethylene partial pressures in the reaction zone.

In reactors employing a fixed bed of catalyst, weight space velocities of ethylene can be varied between about 0.1 and about 5 grams per hour per gram of catalyst or catalyst composite employed. In batch reaction systems or in reaction systems wherein a slurry of catalyst, liquid hydrocarbon reaction medium and ethylene are concurrently passed through a reaction zone (such as a tower or tube), the residence time of ethylene and liquid hydrocarbon reaction medium employed will correspond to the range of space velocities given above. Conversion of weight space velocities to residence times can be effected by calculating volume space velocities from weight space velocities by dividing weights by densities, and calculating the reciprocal of the volume space velocities.

A variety of reaction systems can be employed for the practice of the present process. For example, a fixed bed reactor with either downflow or upflow of ethylene and liquid hydrocarbon reaction medium can be employed. Parallel fixed bed reactors can be employed to obtain continuous operation, as in fixed bed hydrocarbon catalytic cracking units, one bed being dewaxed and/or regenerated while the other bed is on stream by suitable manual or automatic time-cycle valve operations to control the flows of ethylene, liquid hydrocarbon reaction medium, catalyst dewaxing solvent and regeneration gases to each bed of catalyst.

A moving bed or slurry operation can be employed, in which a slurry of catalyst in the liquid hydrocarbon reaction medium is allowed to flow downwardly through a tower or one or more tubes. Ethylene or a solution of ethylene in liquid hydrocarbon reaction medium is injected into the lower portion of the tower or tubes and, optionally, at various elevations within the tower or tubes. A slurry of catalyst and solid ethylene polymers is withdrawn from the lower end of the reactor and unconverted ethylene and/or diluent gases and/or relatively low boiling polymerization products are withdrawn from the upper end of the reactor. In the moving bed operation, the solid ethylene polymers are separated from the catalyst in a zone external to the reaction zone. Thus, the catalyst can be extracted with the liquid hydrocarbon reaction medium or with a specially selected wax solvent in suitable equipment and the catalyst can then be recycled to the reactor. If catalyst activity has deteriorated seriously, the dewaxed catalyst can be subjected to a regeneration treatment prior to its recycle to the reaction zone, as will be described hereinafter.

As will be apparent, other types of reactor may also be employed. Thus, the polymerization process can be carried out batchwise in autoclaves equipped with stirring equipment, for example in autoclaves equipped with magnetically-operated stirring devices. Likewise, stirred autoclaves can be employed even for continuous operations. An example of an autoclave adapted for continuous operation is the so-called Stratco contactor which has been employed to a considerable extent in the sulfuric acid-catalyzed alkylation of isoparaffins with olefins (note U. S. Patent 2,238,802 of J. A. Altshuler et al.). Still another type of reactor which may be employed is that described in R. J. Hengstebeck, U. S. Patent 2,493,917, patented January 10, 1950. The Hengstebeck-type reactor comprises an annular permeable catalyst bed which is partially immersed in a liquid medium. The gaseous reactant is introduced centrally of the catalytic annulus in the vapor space. This type of reactor presents the advantage in the present instance that the bed of catalyst can be partially immersed in a liquid hydrocarbon reaction medium which functions to a substantial extent also as a dewaxing or deresining solvent. The liquid medium can be drawn off continuously or intermittently for the removal of normally solid ethylene polymerization products therefrom, following which the medium can be returned to the catalyst chamber.

In another mode of operation, catalyst, ethylene and liquid hydrocarbon reaction medium can be passed concurrently through a reaction tube or coil, thence to a separator. This method of operation will be described with reference to the annexed figure.

In the annexed figure, a charging stock comprising essentially ethylene, for example ethylene concentrates as produced commercially, substantially free of catalyst poisons and reaction inhibitors, is passed through line 10, thence through a pump or compressor 11, wherein it is brought to a suitable polymerization pressure, for example between about 500 and 5000 p. s. i. g. The compressed ethylene is passed into heater 12, wherein it is heated to a suitable polymerization reaction temperature, for example, between about 100° C. and about 150° C. and discharged into a reaction coil 13 positioned within a temperature regulating bath 14 provided with valved lines 15 and 16 for the admission and removal of a suitable temperature control fluid. A slurry of the liquid hydrocarbon reaction medium and fresh catalyst, for example 5 percent nickel on an activated coconut charcoal support (Burrell) which has been leached with dilute nitric acid, may be charged through valved line 17 into line 10, thence into reaction coil 13. If desired, the catalyst can be pressured directly into coil 13, at one or more points, by the employment of conventional equipment such as lock hoppers pressured by an inert gas or, preferably, by a portion of the ethylene charging stock. Likewise, a prepared catalyst slurry in the liquid hydrocarbon reaction medium may be pumped into coil 13 at one or more points therein. Ethylene may likewise be injected into coil 13 at one or more points therealong. Liquid hydrocarbon reaction medium is passed through line 18 into line 10, thence to reaction coil 13 in an amount sufficient to constitute a distinct liquid phase in coil 13. A suitable residence time of catalyst and ethylene may be obtained by providing a suitable length and diameter of coil 13 or by employing a plurality of coils in which to effect the ethylene polymerization reaction. The principal advantage of employing a series of reaction coils and thermostatic baths resides in the ability to obtain individually controlled temperatures and residence times in the various coils and thus to influence the extent of ethylene conversion and the product distribution.

Upon completion of the desired polymerization reaction, the reaction mixture is discharged through a heat exchanger 19 into separator 20, within which a desired liquid level may be maintained by the employment of conventional liquid level control valves. Suitable temperatures within the separator are between about 80 and about 150° C. Unconverted ethylene, diluent hydrocarbon gases and gasoline boiling range ethylene polymerization products are passed from separator 20 through line 21 and pressure control valve 22, thence through valved line 23 for recycle to the polymerization reactor or through valved line 24 into fractionator 25, there to be fractioned into an ethylene recycle stream, a stream comprising principally butenes, and gasoline. The ethylene recycle stream passes overhead through line 26, thence through valved line 27 into lines 23 and 10 for recycle to coil 13. If desired, part or all of the unconverted ethylene stream may be withdrawn from the system through valved line 28. A butenes fraction is withdrawn from fractionator 25 through valved line 29 and a gasoline fraction through valved line 30. If desired, part or all of the butenes fraction can be combined with the recycle stream passing through line 26. When a gasoline boiling range liquid hydrocarbon reaction medium is employed, as in the case of benzene or xylenes, a substantial proportion thereof is removed with the gasoline fraction in fractionator 25. Accordingly, it may be desirable to recycle the total gasoline fraction to the polymerization reactor to function as the liquid hydrocarbon reaction medium or, if desired, the gasoline stream leaving fractionator 25 through valved line 30 may be refractionated to separate the desired liquid hydrocarbon reaction medium for recycle to the polymerization reaction zone.

A mixture of catalyst, solid ethylene polymerization products and liquid hydrocarbon reaction medium separates in the lower portion of separator 20, whence it is withdrawn through line 31 and recycled, totally or in part through valved line 32, manifold 18 and line 10 to reaction coil 13. Usually, however, all or part of the solids-liquid mixture withdrawn from the lower portion of separator 20 is passed through valved line 33 into separation equipment schematically indicated at 34. A dewaxing or deresining solvent can be introduced into equipment 34 through valved line 51a. The separation equipment may take the form of a centrifuge, a gravity solids classifier of the Dorr type or a filter, for example a filter press or rotary filter. When a filter press or rotary filter is employed it is desirable to introduce a filter aid, such as a diatomaceous earth through line 35. The principal function of separation equipment 34 is to separate the liquid hydrocarbon reaction medium or, usually, a solution of relatively low molecular weight solid ethylene polymers in the liquid hydrocarbon reaction medium from catalyst containing adherent, relatively high molecular weight solid ethylene polymers. The separation is usually accomplished at or about room temperature, or up to about 300° C.

The solution of grease-like and/or paraffin wax-like polymers in the liquid hydrocarbon reaction medium is withdrawn from the separation equipment 34 through valved line 36 into a heat exchanger 37, wherein the temperature of the solution is brought to a desired value for the subsequent separation step. Thus, 37 may represent a direct or indirect heat exchanger, for example equipment in which liquefied propane is mixed with the solution of ethylene polymers in the liquid hydrocarbon reaction medium and then partially evaporated to obtain a suitable reduction in temperature. The cooled mixture is then passed through line 38 into filtration equipment 39, which may take the form of a filter press or rotary filter. A paraffin wax-like product is removed from the filtration equipment 39 by line 40 and the liquid hydrocarbon reaction medium containing grease-like relatively low molecular weight ethylene polymers, optionally in admixture with a liquefied hydrocarbon dewaxing solvent such as propane, is discharged through line 41 and heater 42 into line 43, thence to an evaporator 44 which is provided with a heating coil or jacket 45. The liquid hydrocarbon reaction medium is evaporated in tower 44, whence it is removed through valved line 46 for condensation and recycle to the polymerization process. Relatively low molecular weight grease-like ethylene polymerization products form a melt in the lower portion of tower 44 whence they are removed through valved line 47.

Catalyst containing more or less high molecular weight solid ethylene polymers is removed from separation equipment 34 through line 48, whence all or part thereof may be passed through valved line 49, commingled with liquid hydrocarbon reaction medium in manifold 18 and recycled to polymerization coil 13. If desired, part or all of the catalyst passing through line 49 can be diverted through valved line 49a into regeneration zone 57, whose operation will be described hereinafter. Usually all or at least a substantial part of the contents of line 48 are discharged through valved line 50, thence into line 51 and catalyst dewaxing or deresining equipment 52. A deresining solvent is likewise introduced into zone 52 through valved line 51.

The dewaxing or deresining solvent may be the same as or different from the liquid hydrocarbon reaction medium. The solvent is preferably an aromatic hydrocarbon such as benzene, toluene, a xylene, p-cymene, sec-butylbenzene and the like, although we may employ other solvents such as ethyl benzoate, fluorobenzene, anisole, etc. The extraction equipment 52 may be of conventional design. In order to extract the tough, resinous, high molecular weight ethylene polymers which tend to be tenaciously retained within the pores of the metal-charcoal catalysts, it is important to conduct the extraction operation at temperatures between about the softening points and melting points of the polymers, usually temperatures within the range of about 80° C. to about 150° C. although temperatures up to about 300° C.

may be employed. When a relatively low boiling solvent such as benzene is employed it will be necessary to conduct the extraction or catalyst dewaxing under sufficient pressure to maintain the solvent substantially in the liquid phase at the desired extraction temperature. A solution of waxy and resinous ethylene polymers in the solvent is withdrawn from the extraction equipment 52 through valved line 53. Essentially all the solute can be recovered from this solution by cooling to room temperature or even lower temperatures, e. g. about 10° C., and filtering. By reducing the temperature of the solution gradually, fractional crystallization may be obtained, the highest molecular weight resins being the first to separate as solids from the solution.

A portion of the liquid hydrocarbon reaction medium may be passed into zone 52 through valved line 54 to form a slurry with the dewaxed and deresined catalyst therein, which slurry may be withdrawn through valved line 55 for recycle through manifold 18 into the polymerization coil 13. Part or all of the dewaxed catalyst may be passed from zone 52 through valved line 56 into a regeneration zone indicated schematically by 57.

Regeneration of the metal-carbon catalyst may be effected by treating the catalyst with hydrogen-containing gases at a temperature between about 175° C. and about 400° C., preferably between about 200° C. and about 250° C., under suitable pressure, for example pressures up to about 2000 p. s. i. g. If desired, regeneration of the catalyst may be effected by treating it in zone 57 with oxidizing gases, for example a stream of flue gas containing a low concentration of free oxygen, followed by reduction of the catalyst with hydrogen to produce the active metal as above described. The regenerating gases may be introduced into zone 57 through valved line 58 and withdrawn therefrom through valved line 59. In addition to the above described regeneration treatments the catalyst may also be washed with nitric acid having a concentration between about 15 and about 20 weight percent at about room temperature. The regenerated catalyst is withdrawn from zone 57 through line 60, thence into manifold 18 for recycle through line 10 into polymerization coil 13.

It should be understood that numerous engineering details such as valves, pumps, controllers, etc. have been omitted from the annexed figure in the interests of simplifying the description.

The above-described polymerization process can be conducted and controlled to produce hydrocarbon greases having a molecular weight range of about 300 to about 750 (Menzies-Wright), which have substantial solubility in cold xylene fractions and a relatively highly branched structure, e. g. one methyl branch per chain of about 10 to about 20 methylene groups.

The paraffin-like waxes which can be produced by the above described invention are characterized by substantial solubility in boiling xylenes but relative insolubility in xylene fractions at temperatures between about 20 and about 70° C. They are white, hard and brittle. The paraffin-like waxes have melting points ranging from less than about 50° C. to about 120° C. and specific viscosities ($\eta_{sp} \times 10^5$, Staudinger method) between about 750 and about 10,000. The paraffin wax-like products are further characterized by a relatively high degree of branching, the methylene:methyl group ratios as determined by infrared spectroscopy being in the range of about 15 to about 25, for example, 13.

The hydrocarbon greases produced by the present invention may be employed as a high viscosity index addition agent to lubricating oils and greases and may generally be employed as an impregnating wax, match wax and for compounding with other waxes and oils. The grease-like products are miscible with petroleum-derived paraffin waxes. The grease and paraffin wax-like products produced by the present invention may be subjected to high temperature vapor phase cracking to produce high molecular weight monoolefins which can be polymerized to extremely high V. I. lubricating oils by treatment with Friedel-Crafts catalysts, particularly aluminum chloride promoted by small proportions of hydrogen chloride. The grease-like and wax-like products may also be subjected to catalytic cracking with activated clays or silica-alumina or silica-magnesium type catalysts, optionally together with conventional charging stocks, to produce high octane number gasolines. The grease-like and wax-like products may also be chlorinated, predominantly to the stage of monochlorohydrocarbon compounds which may be chemically condensed with naphthalene or the like in the presence of aluminum chloride to provide pour point depressants for wax-containing lubricating oils.

The tough, resinous high molecular weight polymers which can be produced by the above-described process are characterized by partial solubility in boiling xylene (one atmosphere), softening points between about 70 and about 100° C., melting points between about 100 and about 130° C. and specific viscosities ($\eta_{sp} \times 10^5$, Staudinger method) between about 10,000 and about 25,000. The tough resinous polymers are characterized by relatively infrequent branches in the otherwise linear molecule, the methylene:methyl group ratios as determined by infrared spectroscopy being between about 20 and about 30. The tough resinous ethylene polymers can be cast or molded into tough, thin films or fairly rigid thick films and may be processed by the methods heretofore employed in the treatment and formulation of the well known commercial polyethylene resins. The high molecular weight resins produced by our process may be applied to the same or similar uses as the commercial polyethylene resins. Even thin films of the high molecular weight resinous products produced by the present invention are characterized by extreme chemical resistance, high tear strength, high tensile strength, transparency and high electrical insulating capacity. The tough resinous high molecular weight polymers can be chlorinated to a high chlorine content to produce interesting plastic materials.

The following specific examples are supplied in the interests of clearly delineating species of our broad process and not for the purpose of unduly limiting or restricting the scope of our invention. The examples will be presented in considerable detail to enable their reproduction by those skilled in the art with the exercise of a minimum of independent testing or the exercise of independent judgment or discretion.

In the tabulated examples the cobalt-carbon and nickel-carbon catalysts were prepared, except as otherwise indicated, by absorbing cobaltous nitrate hexahydrate and nickelous nitrate hexahydrate, respectively, on an activated coconut charcoal (Burrell) characterized by a surface area of about 1130 square meters per gram, a pore volume of about 0.59 cc. per gram and a pore diameter of about 21 Å. This activated coconut charcoal was found to contain very small proportions of sodium, potassium, chloride, phosphate and carbonate and chemically combined oxygen. When the charcoal is covered with water the resultant aqueous solution is slightly basic, having a pH of about 9. The activated coconut charcoal was found to contain no ammonia and only traces of heavy metals. Prior to impregnating the coconut charcoal with cobalt or nickel nitrate it was usually leached with dilute nitric acid, employing for example, about 800 ml. of nitric acid per 500 ml. of charcoal. The nitric acid strength was between about 15 and about 20 weight percent and it was employed at about room temperature with a contacting period of about ½ hour. Contact of the activated coconut charcoal with dilute nitric acid results in a vigorous degassing (principally deaeration and the evolution of $CO_2$), followed by a small temperature rise and after a minute or two, the evolution of $NO_2$ fumes, which stops after a few minutes. After the spontaneous evolution of $NO_2$ has ceased the mixture can be heated up to about 60° C. without further evolution of $NO_2$. The charcoal is filtered from the spent nitric acid and dried on a hot plate. Between about 3 and about 8 weight percent of the activated coconut charcoal is extracted by the nitric acid treatment. In a typical instance in which 3.8 weight percent of solids were leached from the activated coconut charcoal by the nitric acid wash, a cation analysis of the leached solids was as follows:

| | | | |
|---|---|---|---|
| K | 23.70 | Na | 0.59 |
| Ca | 6.25 | Fe | 0.25 |
| P | 1.66 | Al | 0.25 |
| Mg | 1.45 | Mn | 0. |
| Si | 0.90 | | | being 35.05 weight percent of the 3.8 weight percent total.

The cobaltous nitrate hexahydrate which was usually employed in the deposition of cobalt on the activated carbon contained the following impurities (in percent by weight):

| | | | |
|---|---|---|---|
| Insoluble matter | 0.01 | Cu | 0.005 |
| Cl | 0.0008 | Fe | 0.006 |
| $SO_4$ | 0.002 | Ni | 0.008 |
| Alkalies and earth as $SO_4$ | 0.01 | | |

The nickelous nitrate hexahydrate which was usually employed in the deposition of nickel on the activated carbon contained the following impurities (in percent by weight):

| | | | |
|---|---|---|---|
| Cl | 0.0003 | Co | 0.03 |
| $SO_4$ | 0.000 | Fe | 0.0004 |
| $NH_3$ | 0.05 | Zn | 0.003 |
| Pb | 0.0005 | Earths and alkalies as $SO_4$ | 0.25 |
| Cu | 0.0005 | | |

In the preparation of the catalysts, an aqueous solution of the metal nitrate was brought into contact with the activated carbon support and a sufficient amount of nitrate was adsorbed to yield the desired quantity of metal on the carbon. The metal nitrate on the active carbon was thermally decomposed to yield the corresponding metal oxide, usually under a reduced pressure between about 1 and about 20 mm. of mercury, absolute. The metal oxide on the active carbon was then reduced by treatment with hydrogen at temperatures between about 250° C. and about 350° C. and pressures between about 900 and about 1500 p. s. i. g.

In examples tabulated herein, operations were conducted in some instances in batch reactors and in other instances, in a continuous flow reaction system. The batch reactors employed were hydrogenation rocking bombs of conventional design having an empty volume of about 183 ml. In the batch reactors, granular catalysts of about 6 to 14 mesh size were employed. The usual procedure in making the batch runs was to force a liquid hydrocarbon reaction medium into the reactor containing the catalyst, thereafter withdrawing sufficient hydrocarbon to provide a calculated volume of 25 to 50 ml. of free space in the reactor and then to pressure ethylene into the reactor under the pressure of a commercial ethylene cylinder. Although substantial pressure drop occurred in the reactors due to the polymerization of ethylene, the reactors were, in many instances, repressured with fresh ethylene charges so long as a substantial rate of pressure drop was observed.

In numerous instances, it was observed that the liquid reaction medium employed had a milky appearance at the end of the reaction, due to the presence therein of suspended, finely-divided ethylene polymer of high molecular weight.

As indicated in the tables, in some examples a slurry of powdered catalyst (300 or more mesh per inch) in the liquid hydrocarbon reaction medium was employed in some of the batch reactor runs.

The usual reaction period in the batch reactors varied between about 2 and about 4 hours, the runs ordinarily being terminated because of a substantially decreased pressure drop as compared with the initial pressure drop.

The flow reactor indicated in certain of the tabulated examples was a vertical steel tube having internal diameter of 1.1 inches and volume of 450 ml. packed with a fixed bed of 6–14 mesh catalyst. The reaction tube contained a central well containing three thermocouples, viz., one at the upper end, one at the middle and one at the lower end of the well. One-fourth inch copper tubing was wound about the reaction tube and air or water was circulated therethrough for temperature control in the reaction tube. Two electrical resistance coils were wound over the copper coils to provide heat. The entire assembly was suitably lagged with insulating material. In all the flow runs operation was satisfactory. The polyethylene product was extruded from the reactor as a white slurry in the liquid reaction medium and was easily collected in the products receiver. The flow runs were usually terminated not because of substantial decrease in catalyst activity but because usually sufficient product had been obtained at the termination time to indicate the success or failure of a run and to provide sufficient material for analytical work.

The specific viscosity values given in the tables ($\eta_{sp} \times 10^5$) were obtained by employing the Staudinger formula (Z. Phys. Chem. 171, 129 (1934)), using 0.125 gram of polyethylene per 100 ml. of boiling xylene at 85° C. for viscosity measurements.

Referring now to Table 1, run 1 relates a test in which a nitric acid-washed, activated coconut charcoal which had been treated with hydrogen was employed in order to test its catalytic activity for ethylene polymerization. It will be noted that activated charcoal alone evidenced no catalytic activity, since no solid ethylene polymers were produced. Run 2 shows that even unextended or unsupported cobalt will catalyze the production of solid wax-like and grease-like ethylene polymers in the presence of benzene. In addition to the 0.1 g. of wax, 0.2 g. of grease was also produced in run 2. However, as will appear hereinafter, the catalytic activity of the unsupported or unextended cobalt or nickel catalysts is of a low order relative to the activity of the activated carbon-supported metals.

A comparison of runs 3 and 4 indicates the relative tolerance of the process of the present invention for oxygen in the charging stock in amounts such as are normally encountered in commercial cylinder ethylene. In run 3 the oxygen concentration in ethylene was 950 p. p. m., whereas in run 4 it was 3 p. p. m. It will be noted that the difference in the yield of solid ethylene polymers was not substantial. Although oxygen did not apparently interfere in the polymerization reaction, it will cumulatively convert the reduced metal catalyst to metal oxide which is catalytically inactive.

temperature. Runs 11 and 12 were conducted at 121° C. which is a satisfactory temperature for operations with the nickel catalyst in the presence of benzene as the liquid hydrocarbon reaction medium. It will be noted that in each instance, substantial yields of relatively high molecular weight ethylene polymers were produced. By comparison, in run 13 the yield of solid ethylene polymer was considerably reduced and the average molecular weight thereof also was somewhat lower.

Some insight on the effects of pressure can be gained by a comparison of runs 14, 15 and 16. In run 14, in which the pressure was only 600 p. s. i. g., 13 weight percent of the ethylene charge was converted, whereas in run 15 at a pressure of 2200 p. s. i. g. 93 weight percent of the ethylene charge was converted. However, the product distributions in runs 14 and 15 were substantially identical and the grease-like products had similar molecular weights. It will be noted from runs 14 and 15, that even at relatively low pressures in the presence of the xylene reaction medium the

*Table 1*

| Run No. | Catalyst | | Solvent | | Temp., °C. | Pressure, p. s. i. g. | Time, min. | Type of reactor | Product—Wax and resins | | | | Remarks |
|---|---|---|---|---|---|---|---|---|---|---|---|---|---|
| | Description | Grams | Type | Ml. | | | | | Grams | M. P., °C. | S.P.¹, °C. | $\eta_{sp} \times 10^5$ | |
| 1 | HNO₃-treated coconut charcoal pretreated with H₂ before use. | 84 | Benzene | 125 | 127 | 1,060–360 | 85 | Batch | None | | | | Test of charcoal alone. |
| 2 | 100% cobalt metal—no charcoal. | 90 | ---do--- | 50 | 121 | 1,040–900 | 345 | ---do--- | 0.1 | | | | No catalyst support. |
| 3 | 10% cobalt on HNO₃-treated coconut charcoal (O₂ in C₂H₄, 950 p. p. m.). | 123 | ---do--- | 125 | 126 | 1,020–500 | 50 | ---do--- | 2.3 | 116–17 | 70–75 | 1,180 | 0.5 g. of additional resin was extracted with sec.butylbenzene. |
| 4 | 10% cobalt on HNO₃-treated coconut charcoal (O₂ in C₂H₄, 3 p. p. m.). | 133 | ---do--- | 125 | 127 | 1,020–700 | 130 | ---do--- | 3.5 | 107–8 | 50 | 1,500 | |

Table 2 presents data obtained in studies with activated carbon-supported nickel catalysts. A comparison of runs 5 and 6 indicates that lowering the concentration of the nickel in the reactor somewhat reduces the rate of solids production from ethylene, as well as the ethylene conversion in a given period. In run 5, 28 weight percent of the ethylene charge was converted whereas in run 6 only 9 weight percent was converted. However, it will be noted that the product distribution was not substantially different in runs 5 and 6. The molecular weight of the grease produced in run 5 was 440 (Menzies-Wright method). The melting point of the wax produced in run 5 was 117–118° C. The methylene:methyl group ratio of the wax-like product derived from run 5 was 13, as determined by infrared spectroscopy. However, the yield of solid polymer per gram of nickel in the catalyst was actually substantially higher in run 6 than in run 5.

A comparison of runs 7 and 8 indicates that, in the range studied, the yields of solid products were roughly proportional to the catalyst concentration. A product of very high specific viscosity was produced in run 9, in which a wood charcoal support was used.

Some indications of the effect of the operating temperature in the present process can be gained by a comparison of runs 10, 11, 12 and 13. It will be noted that in run 10, some polymerization of ethylene to yield normally solid products (average molecular weight, 950) was obtained even at room product distribution was weighted almost entirely in favor of the production of normally solid ethylene polymers, little or no gasoline being produced. Similar product distributions have been observed in flow operations at 300 p. s. i. g. (Table 5). Run 16 was a batch reaction experiment in which the ethylene pressure was allowed to decrease during the reaction period from an initial value of 6000 p. s. i. g. to a terminal pressure of 5150 p. s. i. g. It will be noted that a solid polymer having a specific viscosity of about 15,000 was produced. Fractionation of the solid polymer by xylene extraction showed it to consist of approximately 25 percent of a wax and 75 percent of white, resinous polymer having a specific viscosity which is probably in excess of 18,000 but which could not be precisely determined because the high molecular weight of the resin greatly reduced its solubility even in boiling xylene.

A wax-like polymer having a specific viscosity ($\times 10^5$) of 2400 was produced by the polymerization of ethylene at 50 p. s. i. g. in the presence of 7.5% nickel-charcoal catalyst in a batch reactor, employing 100 ml. of a xylenes fraction as the reaction medium at 121° C. for 120 minutes. Ethylene was recharged at intervals. A cumulative pressure drop of 55 p. s. i. of ethylene was observed during the run.

A comparison of the effects of the ethylene concentration in the liquid hydrocarbon reaction medium, which was a commercial xylenes fraction, is had in runs 17 and 15. With the low ethylene concentration, (run 15), substantially complete ethylene conversion was obtained (93%), dropping rather steeply at the higher ethylene concentration in the liquid hydrocarbon reaction medium to a value of 36% ethylene conversion. However, the product distributions at low and high ethylene concentrations were not substantially different. A high concentration of the hydrocarbon reaction medium in the reaction zone is desirable since it usually aids in removing solid polymer from the catalyst; conversely, at high ethylene concentrations in the hydrocarbon reaction medium the reaction product may in some instances consist essentially of a dispersion of the liquid hydrocarbon reaction medium in a preponderant proportion of solid polyethylenes.

Run 18 was conducted with regenerated catalyst obtained by extraction of solid polyethylenes from the catalyst used in run 17, followed by high temperature treatment with hydrogen. While the extent of ethylene conversion was somewhat lower when the regenerated catalyst was employed, substantial solid polyethylene yields were nevertheless obtained.

The effects of various supports for the nickel catalyst can be discerned by comparing runs 9 and 19–23, inclusive.

It will be noted from run 19 wherein silica gel was employed as a support for nickel that only bare evidence of reaction was obtained, and this in spite of the fact that 115 ml. (96 grams) of catalyst were employed rather than the usual quantity of about 25 grams. In run 20, a commercial nickel-kieselguhr hydrogenation catalyst was reduced with hydrogen and tested; no polyethylene was formed. The catalyst had been treated before use with hydrogen at 400° C. and atmospheric pressure for 5 hours. It appears from a comparison of runs 19 and 20 with other runs in which the catalyst was supported upon activated carbon that there is some specific interaction between the metal and the carbon to produce a catalyst having an efficacy far greater than that of either component alone. As has been shown, the use of unextended metal leads only to relatively low yields of solid polymer (run 2) and the use of activated carbon alone to no yields of solid polymer whatsoever (run 1).

The catalyst in run 9 was nickel supported on a powdered nitric acid-leached wood charcoal having a surface area of 745 square meters per gram, pore volume of 0.57 cc. per gram and pore diameter of 30.6 Å, before impregnation with nickel nitrate. It will be noted that although the yield of polymer was rather low in run 9, the molecular weight was very high, as the product was a tough, pliable film, rather than a wax-like or grease-like material.

Run 21 illustrates the fact that leaching an activated carbon with hydrochloric acid is extremely detrimental to catalyst activity. This will be especially evident by comparison with run 22 in which no leaching step whatever was employed and the yield of solid ethylene polymer was consequently about 50 times as great and the molecular weight was substantially greater. In run 23, the coconut charcoal support was twice leached by immersion in dilute nitric acid. The catalyst made by impregnation of this charcoal was very active, as indicated by the tabulated data. Dilute nitric acid leaching of activated carbon supports is probably more effective at low concentrations of nickel or cobalt, since in such cases the ratio of impurities extracted by the leaching operation to the metal are naturally greater.

In run 24 the feed stock was propylene rather than ethylene. The propylene conversion was extremely low, being only 3 weight percent based on feed, and only a low molecular weight jelly-like product was produced. The contrasting behavior of ethylene in the present polymerization process is quite striking.

Run 25 illustrates the inhibiting effect of even relatively small proportions of acetylene in the polymerization of ethylene by the present process. The predominant solid product was a grease. One possible explanation relates the deleterious effect of acetylene to formation of acetylides on the catalyst. Under otherwise similar operating conditions but in the absence of acetylene the yield of solid ethylene polymer would have been of the order of 60 grams.

We have observed striking and unexpected effects which are attributable to the liquid hydrocarbon reaction medium in the present reaction with nickel catalysts. A comparison of the effects of various liquid hydrocarbon reaction media is afforded in runs 12 and 26 to 35, inclusive, in which the sole substantial variable was the identity of the liquid hydrocarbon reaction medium. In run 12, the employment of benzene yielded 9.7 grams of polymer having a specific viscosity of 3000. In run 26, the use of a mixture of xylenes (boiling range 137.7 to 138.6° C.) led to a markedly higher polymer yield and much of the polymer produced was of substantially higher molecular weight.

The employment of ethylbenzene (run 27) produced an amount of polymer similar to that obtained with benzene but of much higher specific viscosity. A mixture of xylenes and p-cymene (run 28) yielded results similar to those obtained with xylenes alone. The use of mesitylene (run 29) led to a good yield of tough, pliable high specific viscosity polymer. Second-stage extraction of the used catalyst from the mesitylene run with boiling xylenes yielded a tough polymer of 17,600 specific viscosity. It will be noted that the use of alkylbenzenes, particularly methylbenzenes, produces high yields of polymers of unexpectedly high average specific viscosities, as compared with the results obtained y using benzene.

A surprisingly effective reaction medium was n-octane (run 30), although it was less effective for the production of high specific viscosity ethylene polymers than the alkylbenzenes. Isooctane (run 31) was substantially less effective than n-octane from both the product yield and specific viscosity standpoints.

The naphthenes methylcyclohexane (run 32) and decalin (33) did not prove to be as good as xylenes. Tetralin, which may be regarded as an alkylbenzene (run 34), led to the production of polymers in yields comparable to those obtained by the use of xylenes but of even higher specific viscosity.

Aliphatic olefins or olefin polymers are not useful reaction media for the purposes of the present process since they lead to very low or only trace yields of ethylene polymers having molecular weights of at least 300. Thus in run 35, the employment of diisobutylene as the liquid reaction medium produced only a minuscule yield of wax-like ethylene polymer; the yield and product quality were both far inferior to those obtained with the other reaction media, such as xylenes, mesitylene, n-octane, etc. Similar disappointing results have been obtained upon the use of 1-octene and tetradecene.

TABLE 2

| Run No. | Catalyst Description | Catalyst Grams | Solvent Type | Solvent Ml. | C₂H₄ conc. in solvent, weight percent | Temp., °C. | Pressure, p.s.i.g. | S.V.[b] | Duration, minutes | Type of reactor | Ethylene conversion, weight percent | Product Wax and resins Grams | Product Wax and resins $\eta_{sp} \times 10^3$ | Grease, grams | Product distribution, weight percent Solid | Grease | C₆+ | C₄ | C₂H₄ | Remarks |
|---|---|---|---|---|---|---|---|---|---|---|---|---|---|---|---|---|---|---|---|---|
| 5 | 1% nickel on HNO₃-treated coconut charcoal. | 223 | Benzene | | 69 | 140 | 2,200 | 1.0 | 300 | Flow | 28 | 61.0 | 4,250 | 54.0 | 52 | 46 | 2 | | | 0.5 g. gasoline in first 200 min. operation. |
| 6 | 0.1% nickel on HNO₃-treated coconut charcoal. | 199 | do | | 70 | 150 | 2,200 | 0.9 | 195 | do | 9 | 15.0 / 5.0 / 6.9 | 4,300 / 18,500 | 15.0 / 2.0 / .7 | 54 | 46 | | | | Catalyst reduced by half, as compared with Run 8. |
| 7 | 5% nickel on HNO₃-treated coconut charcoal. | 12.5 | Xylene | 100 | | 121 | 1,100 | | 120 | Batch | | | | | | | | | | |
| 8 | do | 25.0 | do | 100 | | 120 | 1,100 | | 120 | do | | 14.0 / .8 | 12,900 / 21,300 | 2.9 | 5.6 | | | | | Product is a tough pliable film; CH₂/CH₃ is 16-20. |
| 9 | 5% nickel on HNO₃-treated activated wood charcoal.[a] | 25.0 | do | 100 | | 121 | 1,100 | | 120 | do | | | | | | | | | | |
| 10 | 5% nickel on HNO₃-treated coconut charcoal (powdered). | 26.7 | Benzene | 100 | | 25 | 1,080-800 | | 120 | do | | 2.2 | 950 | | | | Trace | Lost | 94.4 | First day extraction of catalyst. Second day extraction of catalyst. |
| 11 | do | 22.2 | do | 100 | | 121 | 1,160-900 | | 120 | do | | 6.0 / 1.0 | 3,400 / 7,700 | | | | | | | |

| Run No. | Catalyst Description | Catalyst Grams | Solvent Type | Solvent Ml. | C₂H₄ conc. in solvent, weight percent | Temp., °C. | Pressure p.s.i.g. | S.V.[b] | Duration, minutes | Type of reactor | Ethylene conversion, weight percent | Product Wax and resins Grams | Product Wax and resins $\eta_{sp} \times 10^3$ | Grease Grams | Grease M.W. | Product distribution, weight percent Solid | Grease | C₆+ | C₄ | C₂H₄ | Remarks |
|---|---|---|---|---|---|---|---|---|---|---|---|---|---|---|---|---|---|---|---|---|---|
| 12 | 5% nickel on HNO₃-treated coconut charcoal (powdered). | 26.6 | Benzene | 95 | | 121 | 1,100-950 | | 120 | Batch | | 9.7 | 3,000 | | | 33.0 | | Trace | Lost | 67.0 | Came out as froth. |
| 13 | do | 26.1 | do | 100 | | 160 | 1,100-950 | 0.6 | 120 | do | | 4.4 | 1,100 | | | 18.2 | | Trace | do | 76.8 | Specific velocity 0.6 V./hr./V. |
| 14 | 1% nickel on HNO₃-treated coconut charcoal (powdered). | 200 | Xylene | 1,200 | 18 | 130 | 600 | .6 | 165 | Flow | 13 | 21 | 4,500 | 13 | 404 | 62 | 38 | | | | |
| 15 | 1% nickel on HNO₃-treated coconut charcoal. | 200 | do | | 18 | 130 | 2,200 | .9 | | do | 93 | 54 | 3,500 | 29 | 474 | 65 | 34 | 1 | | | |
| 16 | do | 25 | Benzene | 50 | 57 | 130 | 6,000-5,150 | .6 | 240 | Batch | | 2.3 | 15,000 | 1.5 | 452 | 60 | 31 | 9 | | | |
| 17 | do | 199 | Xylene | | 62 | 130 | 2,200 | .6 | | Flow | 36 | 108 | 6,000 | 58 | 425 | 69 | 31 | | | | |
| 18 | From Run 17; regenerated with hydrogen at 260° C. | 199 | do | | | 130 | 2,300 | | | do | 28 | 47 | 8,000 | 21 | | | | | | | |
| 19 | 5% nickel on silica gel | 96.9 | Benzene | 124 | | 121 | 1,050-970 | | 120 | Batch | | | | | | | | | | | Only bare evidence of polymer formation. |

| Run No. | Catalyst Description | Catalyst Grams | Solvent Type | Solvent Ml. | Temp., °C. | Pressure, p.s.i.g. | Duration, minutes | Type of reactor | Ethylene conversion, weight percent | Product—Wax and resins Grams | M.P. °C. | S.P. °C. | $\eta_{sp} \times 10^3$ | M.W. | Grease Grams | Product distribution, weight percent Solid | Grease | C₆+ | C₄ | C₂H₄ | Remarks |
|---|---|---|---|---|---|---|---|---|---|---|---|---|---|---|---|---|---|---|---|---|---|
| 20 | 65% nickel on kieselguhr | 571 | Xylene | 128 | 121 | 900-800 | | Flow | | | | | | | | | | | | | |
| 21 | 5% nickel on HCl-treated coconut charcoal | 120 | Benzene | | 121 | 1,120-800 | 120 | Batch | | 10.1 | 103-4 / 117-8 / 121-2 | | 3,500 / 1,100 | | 0.2 | | | | | | |
| 22 | 5% nickel on untreated coconut charcoal | 130 | do | 130 | 122 | 1,070-750 | 165 | do | | 5.0 / 5.2 / .3 | <50 / <50 / <50 | | | | 7.2 g. from catalyst; 2.9 g. from benzene. | | | | | | Benzene soluble. Extracted 8 times with hot xylene. Extracted 9th time with hot xylene. |
| 23 | 5% nickel on doubly HNO₃-treated coconut charcoal | 97 | do | 125 | 126 | 1,300-850 | 135 | do | | | | | 3,400 / 4,900 | 588 | | 50 | | 11 | 18 | 21 | |

See footnotes at end of table.

TABLE 2—Continued

| Run No. | Catalyst Description | Catalyst Grams | Solvent Type | Solvent Ml. | Temp., °C. | Pressure, p.s.i.g. | Duration, minutes | Type of reactor | Ethylene conversion, weight percent | Product—Wax and resins Grams | M.P., °C. | S.P., °C. | $\eta_{sp} \times 10^3$ | Grease Grams | M.W. | Product distribution, weight percent Solid | Grease | $C_{6+}$ | $C_4$ | $C_2H_4$ | Remarks |
|---|---|---|---|---|---|---|---|---|---|---|---|---|---|---|---|---|---|---|---|---|---|
| 24 | 1% nickel on HNO₃-treated coconut charcoal. | 191 | 74% propylene, 26% benzene. | | 155 | 2,200 | 240 | Flow | 3 | Trace | | | | 4.4 (contained 0.4 g. of petroleum jelly). | | | | | | | Propylene feed stock. |
| 25 | do | 200 | 20% acetylene, 68% ethylene, 30% benzene. | | 155 | 2,200 | | do | 5 | 2.0 | | | 2,300 | 13.0 | | | 72 | 17 | | | |
| 26 | 5% nickel on HNO₃-treated coconut charcoal (powdered). | 25.8 | Xylene | 100 | 121 | 1,050–950 | 120 | Batch | | 10.7 / 4.8 / ¹5.4 | | | 3,600 / 18,500 | | | 11 | | | (²) | 18.0 | Catalyst expanded to 3 times normal volume. Extracted 2 days with xylene. |
| 27 | do | 26 | Ethylbenzene | 100 | 121 | 1,100–1,000 | 120 | do | | 7.1 / 12.3 / 2.9 | | | 10,600 / 3,600 / 17,600 | | | 82.0 | | | | | |
| 28 | do | 25.8 | 25% p-cymene, 75% xylene. | 100 | 121 | 1,020–980 | 120 | do | | | | | | | | | | | | | |

¹ Propylene dimer.

| Run No. | Catalyst Description | Catalyst Grams | Solvent Type | Solvent Ml. | Temp., °C. | Pressure, p.s.i.g. | Duration, minutes | Type of reactor | Waxes and resins Grams | $\eta_{sp} \times 10^3$ | Grease Grams | M.W. | Product distribution, weight percent Solid | Grease | $C_{6+}$ | $C_4$ | $C_2H_4$ | Remarks |
|---|---|---|---|---|---|---|---|---|---|---|---|---|---|---|---|---|---|
| 29 | 5% nickel on HNO₃-treated coconut charcoal (powdered). | 25.8 | Mesitylene | 100 | 121 | 1,060–980 | | Batch | 7.3 / 14.0 | 5,200 / 19,500 | (Xylene-soxhlet extraction.) (Extracted with xylene and filter aid.) | | | | | | | Extracted with xylene 2 days; 2.1 g. by further extraction with p-cymene. |
| 30 | do | 25.8 | n-Octane | 100 | 121 | 1,080–980 | 100 | do | 11.8 / 2.1 | 3,300 / 10,400 | | | | | | | | |
| 31 | do | 25.8 | Isooctane | 100 | 121 | 1,050–950 | 120 | do | 3.4 | 2,700 | | | | | | | | |
| 32 | do | 25.8 | Methylcyclohexane | 100 | 121 | 1,100–1,000 | 120 | do | 8.5 | 7,700 | | | | | | | | |
| 33 | do | 25.8 | Decalin | 100 | 121 | 1,100–1,000 | 120 | do | 8.5 | 7,500 | 10.1 | 385 | | | | | | |
| 34 | do | 25.8 | Tetralin | 100 | 121 | 1,030–950 | 120 | do | 5.5 | 23,500 | 10.1 | 640 | | | | | | White wax-like material. |
| 35 | do | 7.5 | Diisobutylene | 100 | 121 | 900–760 | 120 | do | .8 | | 10.1 | | | | | | | |

ᵃ Surface area, 745 sq. meters per g.; pore volume, 0.57 cc. per g.; pore diameter, 30.6 Å. Extraction with HNO₃ removed 2.8% inorganic materials from the carbon.
¹ Tough pliable film.
ᵇ Volumes of ethylene and solvent/hr./volume of catalyst.
ᶜ Grams.
² None in gas.

TABLE 3.—Polymerization with cobalt catalyst

| Run No. | Catalyst Description | Grams | Solvent type | Temp., °C. | Pressure, p.s.i.g. | Duration, minutes | Type of reactor | Product — Wax and resins Grams | M.P., °C. | S.P., °C. | $\eta_{sp} \times 10^3$ | Grease Grams | M.W. | Product distribution, weight percent Solid | Grease | $C_{6+}$ | Remarks |
|---|---|---|---|---|---|---|---|---|---|---|---|---|---|---|---|---|---|
| 36 | 5% cobalt-HNO₃ treated charcoal | 295 | 38% benzene, 62% ethylene. | 140 | 2,100 | 240 | Flow | 14.0 | 122 | 89 | 2,100 | 27.0 | 368 | 27 | 53 | 20 | Pressure disc blew out. |
| 37 | 1% cobalt-HNO₃ treated coconut charcoal | 206 | 67% propylene, 33% benzene. | 127–160 | 2,200 | 185 | do | | (¹) | (¹) | | | | | | | |

¹ Propylene dimer.

TABLE 4.—Comparison of ethylene polymerization in vapor phase and with liquid hydrocarbon reaction medium

| Run No. | Catalyst | | Solvent | | Temp., °C. | Pressure p. s. i. g. | Duration, minutes | Type of reactor | Product | | | | | | | | Product distribution, weight percent | | | | Remarks |
|---|---|---|---|---|---|---|---|---|---|---|---|---|---|---|---|---|---|---|---|---|---|
| | Description | Grams | Type | Ml. | | | | | Wax and resins | | | | | Grease | | | | | | | |
| | | | | | | | | | Grams | M. P., °C. | S. P., °C. | $\eta_{sp} \times 10^5$ | M. W. | Grams | M. W. | Solid | Grease | $C_6+$ | $C_4$ | $C_2H_4$ | |
| 38 | 5% cobalt on doubly HNO$_3$-treated coconut charcoal. | 103 | None | | 121 | 1,160–410 | 52 | Batch | | | | | | 3.0 | 415 | | 9.2 | 19.7 | 59.7 | 11.4 | $K=1.99 \times 10^{-4}$ (second order reaction). Total product was a grease. |
| 39 | 5% cobalt on HNO$_3$-treated coconut charcoal (doubly HNO$_3$-treated). | 104 | Benzene | 125 | 121 | 1,190–790 | 120 | do | | | | | | 4.2 | | | 20.7 | 32.0 | 20.7 | 26.6 | |
| 40 | 5% nickel on HNO$_3$-treated coconut charcoal. | 96 | None | | 124 | 1,240–800 | 25 | do | | | | | 492 | 2.6 | | | 11 | None | Trace | 89 | First product was benzene soluble. Second product was obtained by 8 soxhlet extractions of the catalyst with refluxing xylene. Third product was obtained by a 9th extraction of the catalyst with refluxing xylene. |
| 23 | 5% nickel on doubly HNO$_3$-treated coconut charcoal. | 97 | Benzene | 125 | 126 | About 1,200 | 85 | do | 5.0 5.2 0.3 | 103–4 117–8 121–2 | 50 50 50 | 3,400 4,900 | 588 | | | 50 | | 11 | 18 | 21 | |

In Table 3 are presented data illustrating the effects of cobalt-charcoal catalysts. It will be noted from run 36 that the cobalt catalyzed polymerization of ethylene gave good results even though the run was terminated because of the rupture of a safety disc. The space velocity (both ethylene and benzene) was 0.3 g./hr./g. catalyst and 45 weight percent of the feed stock was converted. In run 37, in which the feed was propylene, the product was largely propylene dimer.

A comparison of vapor phase ethylene polymerization and ethylene polymerization in the presence of a liquid hydrocarbon (benzene) medium is presented in Table 4, which also affords a comparison of nickel and cobalt catalysts. It will be noted from the data presented in Table 4 that the presence of a liquid hydrocarbon reaction medium favorably affected the ethylene polymerization reaction in the direction of producing increased yields of normally solid polymers of ethylene. The presence of a liquid hydrocarbon reaction medium was shown substantially to increase the proportion of solid ethylene polymers in the total products produced by ethylene polymerization. Specifically, with the cobalt catalysts, the use of benzene as the reaction medium (run 39) reduced the yield of gasoline boiling range products to about 53 percent from the value of about 80 percent obtained in the vapor phase operation (run 38) and the yield of grease-like polymers was more than doubled. With the nickel catalyst the results were even more striking, since vapor phase operation (run 40) yielded only a grease-like product, whereas in the presence of benzene (run 23), half the product was wax-like material of 3400–4900 specific viscosity ($\times 10^5$). It will be noted that nickel is superior to cobalt for the production of high molecular weight polymers.

Even more striking product distributions weighted almost exclusively towards high molecular weight polymers to the substantial exclusion of gasoline boiling range products will be apparent from the illustrative continuous flow operations with nickel-charcoal catalysts set forth in Table 5. In this operation, xylene was circulated downflow over a 5% nickel-on-charcoal catalyst at such a rate that the reactor was maintained two-thirds full of liquid. An ethylene pressure of 300 p. s. i. g. was maintained in the upper portion of the reactor and the only ethylene entering the reaction was that absorbed in the xylene at 124° C. Solid ethylene polymer was produced and collected in five portions. Similar operations conducted at an ethylene pressure of 900 p. s. i. g. had little or no effect on the specific viscosity of the products (average), but the solid products constituted between about 50 and 90 percent of the total.

Table 5

| Period | 1 | 2 | 3 | 4 | 5 | Extraction of catalyst |
|---|---|---|---|---|---|---|
| Ethylene, p. s. i. g | 300 | 300 | 300 | 300 | 300 | |
| S. V. (vol. xylene/Vc./hr.) | 1.7 | 1.7 | 2.2 | 3.3 | 1.8 | |
| Temperature, ° C | 124 | 124 | 124 | 124 | 124 | |
| Grams of product: | | | | | | |
| Grease | 6.1 | 4.8 | 4.8 | 1.2 | 1.1 | 3.6 |
| Solid | 6.4 | 3.0 | 2.0 | 1.1 | 1.4 | 7.2 |
| Total | 12.5 | 7.8 | 6.8 | 2.3 | 2.5 | 10.8 |
| $\eta_{sp} \times 10^5$ (solid) | 7,100 | 9,500 | 10,000 | 11,100 | 7,600 | 8,700 |
| Molecular weight (grease) | 439 | 598 | 367 | 588 | 589 | 570 |
| Weight percent products: | | | | | | |
| Grease | 49 | 62 | 71 | 52 | 44 | 33 |
| Solid | 51 | 38 | 29 | 48 | 56 | 67 |

Data obtained in the attempted polymerization of ethylene with various catalysts other than nickel and cobalt are presented in Table 6.

*Table 6*

| Run No. | Catalyst | | Solvent | | Temp., °C. | Pressure, p. s. i. g. | Duration, minutes | Type of reactor |
|---|---|---|---|---|---|---|---|---|
| | Description | Grams | Type | Ml. | | | | |
| 41 | 5% iron-HN₃-treated coconut charcoal | 115.5 | Benzene | 125 | 121 | 1,100–800 | 130 | Batch. |
| 42 | 5% copper-HN₃-treated coconut charcoal | 95 | do | 109 | 121 | 1,060–1,000 | 240 | Do. |
| 43 | 5% zinc oxide-HNO₃-treated coconut charcoal | 95 | do | 106 | 121 | 1,060–1,000 | 120 | Do. |
| 44 | 1% Pd-HNO₃-treated coconut charcoal | 92 | do | 116 | 121 | 1,060–1,020 | 150 | Do. |

It was found in run 41 that although iron was not completely inactive as a catalyst, since it yielded of the order of 0.1 weight percent of solid ethylene polymer, the iron catalyst was nevertheless far inferior to cobalt-carbon and nickel-carbon catalysts. The polymer obtained in run 41 was of relatively low molecular weight.

In run 42, in which copper supported on nitric acid-washed coconut charcoal was employed as the catalyst, essentially negative results were obtained. Only a trace of polymer which was too small to weight readily appeared as a light scum on the surface of the beaker.

In run 43 a zinc oxide-charcoal catalyst was employed. The zinc oxide produced by the decomposition of zinc nitrate could not be reduced with hydrogen. This catalyst gave only a trace of solid ethylene polymer.

In run 44 a palladium charcoal catalyst was employed and found to give results similar to the copper-charcoal catalyst. Although palladium, cobalt and nickel have the common property of being good hydrogenation catalysts it will be apparent from the data herein presented that they are by no means functional equivalents for the polymerization of ethylene.

Having thus described our invention, what we claim is:

1. A process which comprises contacting ethylene with about 50 percent by weight thereof of a catalyst consisting essentially of 5 percent nickel deposited upon a nitric acid-washed activated coconut charcoal having a surface area of about 1150 square meters per gram in the presence of a mixture of xylenes in the amount of about 3½ grams per gram of ethylene charged at a temperature of about 120° C. and a pressure of about 1000 p. s. i. g., and thereafter separating a tough, resinous polyethylene, a solution of 0.125 gram of which dissolved in 100 ml. of xylene at 85° C. having a specific viscosity ($\eta_{sp} \times 10^5$) of about 13,500 as a product of the reaction.

2. A process for polymerizing ethylene which comprises contacting ethylene with a catalyst comprising essentially an activated carbon-supported metal selected from the class consisting of nickel, cobalt and mixtures of cobalt and nickel in the presence of a liquid hydrocarbon reaction medium selected from the class consisting of alkanes having more than 3 carbon atoms per molecule, cycloalkanes and aromatic hydrocarbons, the proportion of said medium being at least about 10 weight percent of the weight of ethylene and said medium, effecting said contacting under suitable polymerization conditions including a temperature selected within the range of about 10° C. to about 300° C. and a pressure of at least about 50 p. s. i. g., and separating polymerization products comprising a substantial proportion of an ethylene polymer having a molecular weight of at least about 300.

3. The process of claim 2 which comprises the additional step of extracting the catalyst with a solvent, thereby recovering a normally solid polymer of ethylene from said catalyst.

4. The process of claim 2 wherein said polymerization temperature is between about 100° C. and 150° C.

5. The process of claim 2 wherein said polymerization temperature is between about 100° C. and about 150° C. and the polymerization pressure is between about 300 and about 8000 p. s. i. g.

6. The process of claim 2 wherein said activated carbon is a charcoal derived from a cellulosic material, said charcoal having a surface area between about 700 and about 1200 square meters per gram.

7. The process of claim 2 wherein said activated carbon is an activated coconut charcoal.

8. A process for polymerizing ethylene which comprises contacting ethylene with a catalyst comprising essentially an activated coconut charcoal-supported nickel in the presence of a liquid hydrocarbon reaction medium selected from the class consisting of alkanes having more than 3 carbon atoms per molecule, cycloalkanes and aromatic hydrocarbons, the proportion of said medium being at least about 10 weight percent of the weight of ethylene and said medium, effecting said contacting under suitable polymerization conditions including a temperature selected within the range of about 10° C. to about 300° C. and a pressure of at least about 50 p. s. i. g., and separating polymerization products comprising a substantial proportion of normally solid polyethylenes.

9. The process of claim 8 wherein said polymerization temperature is between about 100° C. and about 150° C.

10. The process of claim 8 wherein said liquid hydrocarbon reaction medium is an aromatic hydrocarbon.

11. The process of claim 8 wherein said liquid aromatic hydrocarbon reaction medium comprises methylbenzenes.

12. The process of claim 8 wherein said liquid hydrocarbon reaction medium is a saturated hydrocarbon having more than 3 carbon atoms per molecule.

13. The process of claim 8 which comprises the additional step of extracting the catalyst with a solvent, thereby recovering a normally solid polymer of ethylene from said catalyst.

14. A process for polymerizing ethylene which comprises contacting ethylene with a catalyst comprising essentially an activated coconut charcoal-supported cobalt in the presence of a liquid hydrocarbon reaction medium selected from the class consisting of alkanes having more than 3 carbon atoms per molecule, cycloalkanes and aromatic hydrocarbons, the proportion of said medium being at least about 10 weight percent of the weight of ethylene and said medium, effecting said contacting under suitable polymerization conditions including a temperature selected within the range of about 10° C. to about 300° C. and a pressure of at least about 50 p. s. i. g., and separating polymerization products comprising a substantial proportion of normally solid polyethylenes.

15. The process of claim 14 wherein the polymerization temperature is between about 100° C. and about 150° C.

16. A process for polymerizing ethylene predominantly to normally solid polymers, which process comprises contacting ethylene and a xylene, the proportion of said xylene being at least about 10 weight percent of the weight of said ethylene and said xylene, with a catalyst comprising essentially activated carbon-supported nickel at a temperature between about 100° C. and about 150° C. and a pressure between about 500 and about 5000 p. s. i. g., and separating normally solid ethylene polymerization products having an average molecular weight of at least about 300 as a reaction product.

References Cited in the file of this patent

UNITED STATES PATENTS

| Number | Name | Date |
| --- | --- | --- |
| 2,181,640 | Deanesly | Nov. 28, 1939 |
| 2,231,231 | Subkow | Feb. 11, 1941 |
| 2,259,961 | Myddleton | Oct. 21, 1941 |
| 2,457,556 | Heinemann | Dec. 28, 1948 |
| 2,460,303 | McAllister | Feb. 1, 1949 |
| 2,500,056 | Barr | Mar. 7, 1950 |